(12) United States Patent
Min (10) Patent No.: US 12,397,640 B2
(45) Date of Patent: Aug. 26, 2025

(54) DRIVE MODE SETTING DEVICE AND DRIVE MODE SETTING METHOD

(71) Applicant: HL MANDO CORPORATION, Pyeongtaek-si (KR)

(72) Inventor: Seunggi Min, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 544 days.

(21) Appl. No.: 17/416,763

(22) PCT Filed: Dec. 16, 2019

(86) PCT No.: PCT/KR2019/017822
§ 371 (c)(1),
(2) Date: Jun. 21, 2021

(87) PCT Pub. No.: WO2020/130542
PCT Pub. Date: Jun. 25, 2020

(65) Prior Publication Data
US 2022/0073137 A1    Mar. 10, 2022

(30) Foreign Application Priority Data
Dec. 20, 2018 (KR) .................. 10-2018-0166027

(51) Int. Cl.
*B60K 35/21* (2024.01)
*B60K 35/00* (2024.01)
(Continued)

(52) U.S. Cl.
CPC ............ *B60K 35/212* (2024.01); *B60K 35/00* (2013.01); *B62D 5/0463* (2013.01); *B62D 6/007* (2013.01);
(Continued)

(58) Field of Classification Search
CPC ........ B62D 5/0463; B62D 6/007; B62D 5/00; B62D 6/00
(Continued)

(56) References Cited

U.S. PATENT DOCUMENTS

2008/0097674 A1* 4/2008 Kuwahara ............. B60W 50/14
701/51
2010/0010697 A1* 1/2010 Soma ...................... B60L 50/61
903/903
(Continued)

FOREIGN PATENT DOCUMENTS

DE    102012011503 A1 * 6/2013 ............ B60K 37/06
JP    2014144771 A    8/2014
(Continued)

OTHER PUBLICATIONS

Burghoff C—English Description of DE-102012011503-A1 via Espacenet Patent Translate, retrieved Nov. 14, 2023. (Year: 2023).*
(Continued)

*Primary Examiner* — Erin M Piateski
*Assistant Examiner* — Paul Allen
(74) *Attorney, Agent, or Firm* — Hauptman Ham, LLP (57) ABSTRACT

The present disclosure relates to a drive mode setting device and a drive mode setting method, and specifically, to a technology for combining a plurality of drive modes with which a vehicle is equipped. According to one aspect of the present disclosure, provided is a drive mode setting device including: a combining command receiving unit which receives a drive mode combining command instructing the combining of at least two drive modes among a plurality of pre-stored drive modes; a combined drive mode setting unit which sets a combined drive mode by combining at least two drive modes on the basis of the drive mode combining command; and a driving control unit which determines a (Continued)

steering assistance force value for a steering input value by a driver on the basis of the combined drive mode, and generates and outputs a driving control signal corresponding to the steering assistance force value.

15 Claims, 8 Drawing Sheets

(51) Int. Cl.
*B60K 35/10* (2024.01)
*B60K 35/22* (2024.01)
*B60K 35/25* (2024.01)
*B60K 35/26* (2024.01)
*B62D 5/04* (2006.01)
*B62D 6/00* (2006.01)

(52) U.S. Cl.
CPC .............. *B60K 35/10* (2024.01); *B60K 35/22* (2024.01); *B60K 35/25* (2024.01); *B60K 35/26* (2024.01); *B60K 2360/126* (2024.01); *B60K 2360/128* (2024.01); *B60K 2360/143* (2024.01); *B60K 2360/1442* (2024.01)

(58) Field of Classification Search
USPC ...................................................... 701/41–44
See application file for complete search history.

(56) References Cited

U.S. PATENT DOCUMENTS

| | | | | |
|---|---|---|---|---|
| 2012/0203430 | A1* | 8/2012 | Shimada | B62D 6/007 701/41 |
| 2013/0197757 | A1* | 8/2013 | Ellis | B62D 6/007 701/41 |
| 2014/0163822 | A1* | 6/2014 | Strecker | B62D 6/008 701/42 |
| 2014/0200779 | A1* | 7/2014 | Aoki | B60W 50/082 477/44 |
| 2016/0339916 | A1 | 11/2016 | Norton et al. | |
| 2017/0129500 | A1* | 5/2017 | Hipp | B60K 35/00 |
| 2017/0267256 | A1* | 9/2017 | Minster | G01C 21/3407 |
| 2017/0341654 | A1 | 11/2017 | Prakah-Asante et al. | |
| 2019/0118830 | A1* | 4/2019 | Kwon | B60K 35/28 |

FOREIGN PATENT DOCUMENTS

| | | |
|---|---|---|
| KR | 10-20100061199 A | 6/2010 |
| KR | 10-20170012062 A | 2/2017 |
| WO | 2016/024199 A1 | 2/2016 |

OTHER PUBLICATIONS

Weighted arithmetic mean—Wikipedia; captured via archive.org, Feb. 4, 2017 (Year: 2017).*

International Search Report (with partial translation) and Written Opinion issued in corresponding International Patent Application No. PCT/KR2019/017822, dated Dec. 16, 2019.

Notice of Allowance dated Jun. 27, 2024 for corresponding Korean Patent Application No. 10-2018-0166027, along with an English translation (7 pages).

* cited by examiner

DRIVE MODE SETTING DEVICE AND DRIVE MODE SETTING METHOD

CROSS-REFERENCE OF RELATED APPLICATIONS

This application is the U.S. National Phase under 35 U.S.C. § 371 of International Patent Application No. PCT/KR2019/017822, filed on Dec. 16, 2019, which claims the benefit of Korean Patent Application No. 10-2018-0166027, filed on Dec. 20, 2018, the entire disclosures of each are incorporated by reference herein.

Technical Filed

The present disclosure relates to a drive mode setting device and a drive mode setting method, and more particularly, to a technology for combining a plurality of drive modes mounted on a vehicle.

BACKGROUND ART

Conventionally, there is provided a method for providing a driver with various driving feelings by using driving parameters separately set according to normal mode, eco mode, sport mode, comfort mode, etc. Accordingly, the driver may operate the vehicle by selecting each mode according to driving taste. However, it is difficult to satisfy various driving tastes for each individual only with such a preset driving mode. In addition, there is a problem in that the driver needs to individually set the steering parameters of host vehicle in order to set the driving parameters to suit his driving taste.

DISCLOSURE

Technical Problem

In this background, an object of the present disclosure is to provide a technique for combining pre-stored drive modes.

Another object of the present disclosure is to provide a technique for setting anew drive mode by combining pre-stored drive modes.

Technical Solution

In one aspect of the present disclosure, the present disclosure provides a drive mode setting device including a combining command receiver for receiving a drive mode combining command for instructing combining of at least two drive modes from among a plurality of pre-stored drive modes, a combined drive mode setter for setting a combined drive mode by combining the at least two drive modes based on the drive mode combining command, and a driving controller for determining a steering assistance force value with respect to a steering input value of a driver based on the combined drive mode, and generating and outputting a driving control signal corresponding to the steering assistance force value.

In another aspect of the present disclosure, the present disclosure provides including receiving a drive mode combining command for instructing combining of at least two drive modes from among a plurality of pre-stored drive modes, setting a combined drive mode by combining the at least two drive modes based on the drive mode combining command, and determining a steering assistance force value with respect to a steering input value of a driver based on the combined drive mode, and generating and outputting a driving control signal corresponding to the steering assistance force value.

Advantageous Effects

According to an embodiment of the present disclosure, it is possible to provide a steering feel adjusted for each user by combining the characteristics of at least two drive modes selected from among the plurality of pre-stored drive modes and outputting a steering assistance force according to the combined characteristics.

In addition, according to another embodiment of the present disclosure, it is possible to set a new drive mode by combining pre-stored drive modes.

MODE FOR DISCLOSURE

The present disclosure may be various modified and may include various embodiments, and it will be illustrated specific embodiments in the drawings and will be described specific embodiments in detail through the detailed description. However, this is not intended to limit the present disclosure to specific embodiments, and should be understood to include all modifications, equivalents and substitutes included in the spirit and scope of the present disclosure. In describing the present disclosure, if it is determined that a detailed description of a related known technology may unnecessarily obscure the subject matter of the present disclosure, the detailed description thereof will be omitted. Also, as used herein and in the claims, the terms "a" are generally to be construed to mean "one or more" unless stated otherwise.

Hereinafter, embodiments of the present disclosure will be described in detail with reference to the accompanying drawings, and in the description with reference to the accompanying drawings, the same or corresponding components are given the same reference numerals and overlapping descriptions thereof may be omitted.

Figure 1:
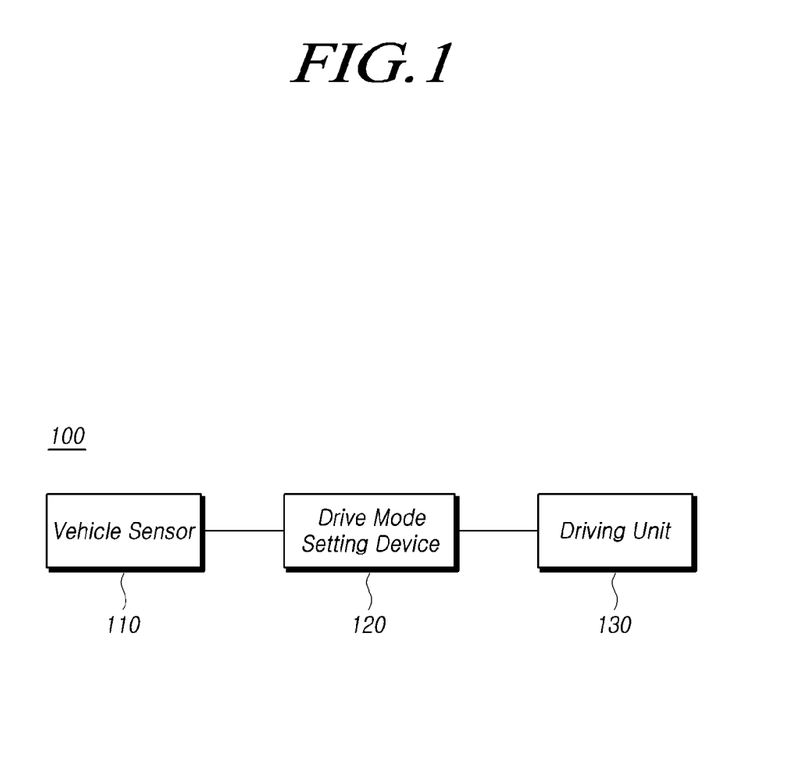
FIG. 1 is a diagram illustrating a configuration of a drive mode system according to an embodiment of the present disclosure.

FIG. 1 is a diagram illustrating a configuration of a drive mode system 100 according to an embodiment of the present disclosure.

Referring to FIG. 1, a drive mode system 100 according to an embodiment may include a vehicle sensor 110, a drive mode setting device 120, and a driving unit 130.

The vehicle sensor 110 may detect all commands input by a driver to the vehicle to control the vehicle, and transmit the command input from the driver to the drive mode setting device 120, and the drive mode setting device 120, or a vehicle control device mounted on the vehicle to control the drive mode setting device 120 or the driving unit 130, etc.

In one embodiment, the vehicle sensor 110 may be a drive mode combining switch. Specifically, the drive mode combining switch may sense a drive mode combining command input from the driver and transmit the sensed drive mode combining command to the drive mode setting device 120.

Here, the drive mode combining command is a signal for instructing combining of at least two drive modes among a plurality of pre-stored drive modes, and may include a plurality of pre-stored drive modes to be combined and a combining weight.

When the driver holds the steering wheel and steers, the steering assistance force for assisting the steering varies according to the drive mode. That is, if the drive mode is changed, the output steering assistance force is different even if the degree of manipulation of the steering wheel is the same.

Such a drive mode includes a normal mode, a comfort mode, an eco-mode as fuel economy mode, and a sport mode, however, is not limited thereto. In each drive mode, at least one of a plurality of parameter values such as auxiliary torque for driver torque, damping coefficient, inertia, and restoring force may be set differently.

Here, the combining weight may mean a ratio when combining each of two or more drive modes. For example, the combining weight may be a 2:1 ratio for the normal mode and the eco-mode.

According to an example, the combining weight may be an application ratio reflected in the steering assistance force output by a specific drive mode selected from among two or more drive modes. For example, if the combining weight for each of the normal mode and the eco-mode is 1:1 (0.5:0.5), the first steering assistance force output by the normal mode is multiplied by 0.5 and applied, and the second steering assistance force output by the fuel economy mode is multiplied by 0.5 and applied.

Alternatively, according to another example, a combined drive mode may be generated by applying a combining weight to each parameter set for a drive mode to be combined. Thereafter, the steering assistance force may be determined from the combined drive mode generated based on the steering input value of the driver. For example, if the combining weight for each of the normal mode and the eco-mode is 1:1 (0.5:0.5), a new parameter values obtained by combining a value obtained by multiplying each parameter of the normal mode by 0.5 and a value obtained by multiplying each parameter of the eco-mode by 0.5 may be determined as the parameters of the combined drive mode.

In one embodiment, the vehicle sensor 110 may be a steering angle sensor, a steering torque sensor, or the like. Specifically, steering angle information and steering torque information are generated by the driver holding the steering wheel and steering, and the vehicle sensor 110 may generate a steering input value by detecting the steering angle information and steering torque information, and may transmit the generated steering input value to the drive mode setting device 120.

Here, the steering input value may be an electric signal corresponding to the detected steering angle information, steering torque information, and the like.

The drive mode setting device 120 may combine a plurality of drive modes pre-stored in the vehicle. Specifically, the drive mode setting device 120 may receive a drive mode combining command from the vehicle sensor 110. The drive mode setting device 120 may combine pre-stored drive modes according to the received drive mode combining command. The drive mode setting device 120 may set a pre-stored drive mode of the vehicle or set a combined drive mode according to the combined drive mode.

Here, the combined drive mode may mean that at least two drive modes are combined. For example, there are a first combined drive mode in which the normal mode and the sport mode are combined, a second combined drive mode in which the normal mode, the eco-mode and the sport mode are combined.

Such a combined drive mode may be a mode in which the above-described combining weight is reflected. For example, if the combining weight for each of the normal mode and the sport mode is 6:4, the combined drive mode is combined in a ratio of 0.6 of the normal mode and 0.4 of the sports mode. That is, the combined drive mode is a mode in which the normal mode is applied at a rate of 0.6, and the sport mode is applied at a rate of 0.4.

In addition the drive mode setting device 120 may determine the steering assistance force value for the steering input value according to the set drive mode, and output a driving control signal corresponding to the determined steering assistance force value to the driving unit 130.

The driving unit 130 may drive the vehicle by receiving the driving control signal output according to a set combined drive mode or a pre-stored drive mode.

Specifically, the drive setting device 120 sets a drive mode, determines the steering assistance force value for a steering input value generated by the vehicle sensor 110 and outputs a drive control signal to the driver 130. Then, the driving unit 130 generates an assist current according to the received driving control signal, and drives using the generated assist current to generate a steering assist force.

The driving unit 130 may include, for example, an assist motor, a reaction force motor, or a driving motor, is not limited thereto.

Hereinafter, it will be described an embodiment of a drive mode combining switch according to the present disclosure.

Figure 2:
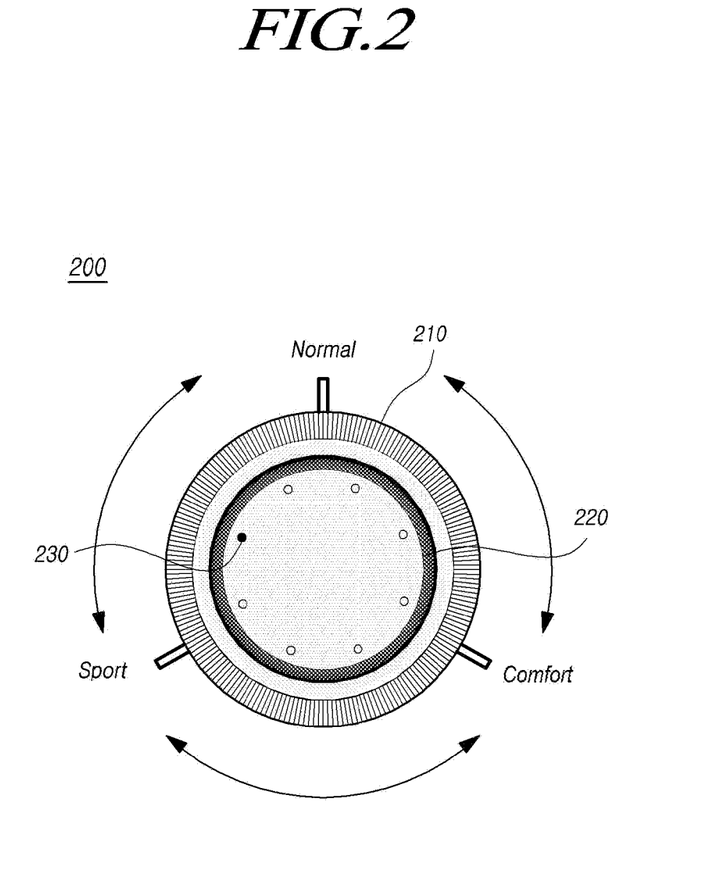
FIG. 2 is a diagram illustrating a drive mode combining switch according to an embodiment of the present disclosure.

FIG. 2 is a diagram illustrating a drive mode combining switch according to an embodiment of the present disclosure.

Referring to FIG. 2, in the case that the drive mode combining switch according to an embodiment includes a tuning member 200, the driver may select a desired drive mode or set the combined drive mode by physically converting the tuning member 200.

That is, the drive mode combining command may be generated by the drive combining switch including the tuning member 200.

In addition, the at least two drive modes to be combined may each be selected by a tuning position indicated by the tuning member 200.

Here, the tuning member 200 may include, for example, a jog shuttle, a dial, or a knob.

To implement this, the tuning member 200 may include a stator 210, a rotor 220 and a reference point 230 as shown in FIG. 2.

The stator 210 may display pre-stored drive mode and combining weight information, and may maintain a fixed state regardless of the rotation of the rotor 220.

The rotor 220 includes the reference point 230 for indicating a tuning position, and the reference point 230 indicates a specific drive mode and weight if the rotor 220 is rotated by the driver.

That is, in the case that the drive mode combining command further includes a combining weight of each of the at least two drive modes, the combining weight may be determined by a tuning position indicated by the tuning member 200, respectively.

Here, the tuning position may be indicated by a scale engraved on the stator 210, however, is not limited thereto.

For example, when the driver turns and operates the rotor 220 and the reference point 230 indicates the center position of the normal mode and the sport mode, the normal mode and the sports mode are selected, and a combining weight of each of the normal mode and the sports mode is determined to be 0.5, respectively. The drive mode combining switch then generates a drive mode combining command including information about the selected drive mode and the determined combining weight.

Meanwhile, in order for the driver to accurately recognize a specific drive mode corresponding to a specific position, the drive mode combining switch may generate a vibration, a notification sound, and the like, and provide it to the driver.

For example, when the reference point 230 is moved by the rotation of the rotor 220 to accurately indicate a position corresponding to any one of the normal mode, the comfort mode and the sports mode, the tuning member 200 generates vibration.

In addition, the drive mode combining switch may preset different vibrations, notification sounds, etc. for each specific position of, for example, a normal mode, a comfort mode and a sports mode.

Meanwhile, the driver can easily perform conversion between drive modes through the drive mode combining switch. For example, the tuning member 200 may include a rotor 220 for perform a changeover switch function to quickly switch between two or more drive modes.

Specifically, if the driver presses the rotor 220 once, the tuning member 200 switches from the first drive mode (e.g., normal mode) to the second drive mode (e.g., sports mode). In addition, if the driver presses the rotor 220 once again, the tuning member 200 switches from the second drive mode (e.g., sports mode) to the third drive mode (e.g., comfort mode). However, this is an example and is not limited thereto.

In order to perform the above-described operation, the drive mode combining switch may include an IC chip, a capacitor, and a variable resistor (Potentiometer). If the above-described operation can be performed, the drive mode combining switch may include various configurations, but is not limited thereto.

Although not shown, in the case that the tuning member is formed of a knob, the driver may set the combined drive mode by manipulating the knob.

Since the above-described drive mode combining switch and tuning member 200 are only examples, it is obvious that a specific drive mode and combining weight may be implemented in such a way of directly inputting by the driver.

Figure 3:
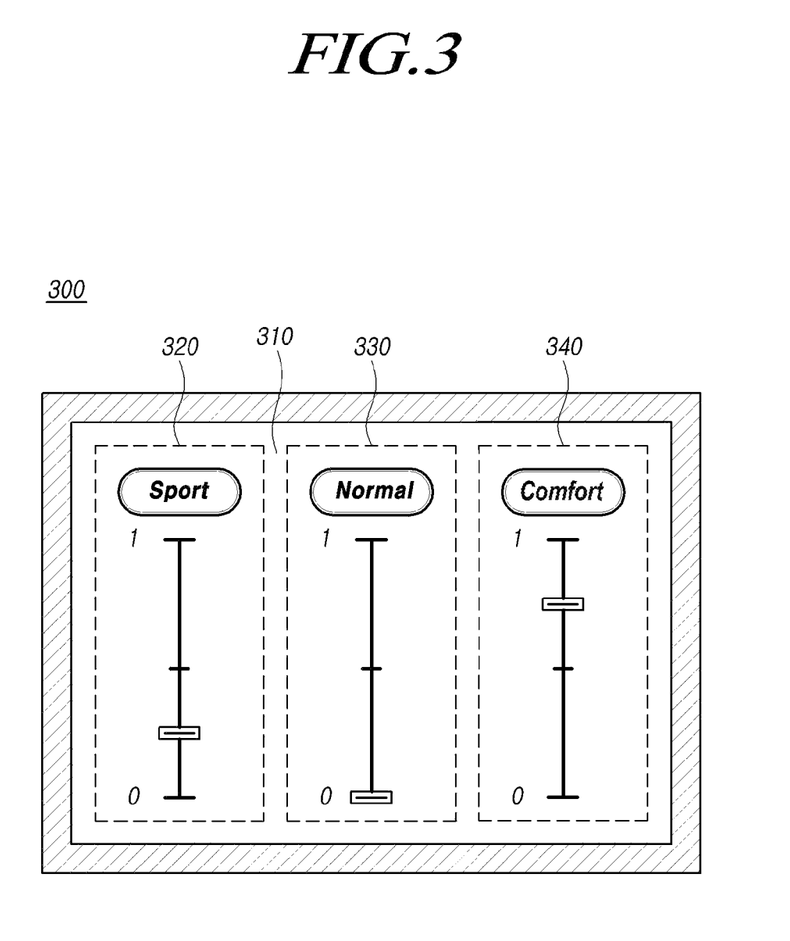
FIG. 3 is a diagram illustrating a drive mode combining switch according to another embodiment of the present disclosure.

FIG. 3 is a diagram illustrating a drive mode combining switch according to another embodiment of the present disclosure.

Referring to FIG. 3, in the case that the drive mode combining switch according to another embodiment includes the touch recognition device 300, the driver may select a desired drive mode or set a combined drive mode by touching an image displayed on the touch recognition device 300.

That is, the drive mode combining command may be generated by the drive combining switch including the touch recognition device 300.

In addition, at least two drive modes to be combined may be selected by a touch recognition position recognized through the touch recognition device 300, respectively.

Here, the touch recognition device 300 may include a panel including a touch panel and a display panel, a controller, an IC chip, and the like.

If icons corresponding to each of the sports mode, normal mode, and comfort mode are displayed on the image 310 of the touch recognition device 300, the driver may select a drive mode by touching an icon displayed with a character among the drive mode icons 320, 330 and 340, and may select a combining weight by touching a tuning icon among the drive mode icon icons 320, 330 and 340.

For example, if the driver touches a sports character among the sports mode icons 320 and a comfort character among the comfort mode 340 icons among the drive mode icons 320, 330 and 340 displayed in the image 310 to activate, the sport mode and comfort mode are selected. In addition, if the driver touches each tuning icon of the sport mode icon 320 and the comfort mode icon 340, the combining weight of the sport mode and the comfort mode is determined according to the touch recognition position. The drive mode combining switch then generates a drive mode combining command including information about the selected drive mode and the determined combining weight.

Here, as described above, in the case that the drive mode combining command further includes the combining weight of each of at least two drive modes, the combining weight may be determined by each touch recognition position recognized through the touch recognition device 300.

The image 310 displayed on the touch recognition device 300 is not limited to that shown in FIG. 3, and may include the same image as the tuning member 200 as shown in FIG. 2. In this case, the driver may implement the above-described operation by moving the tuning member image in a clockwise or counterclockwise direction while touching the tuning member image.

Since the above-described drive mode combining switch and touch recognition device 300 are only examples, it is obvious that a specific drive mode and combining weight may be implemented in such a way of directly inputting by the driver.

Figure 4:
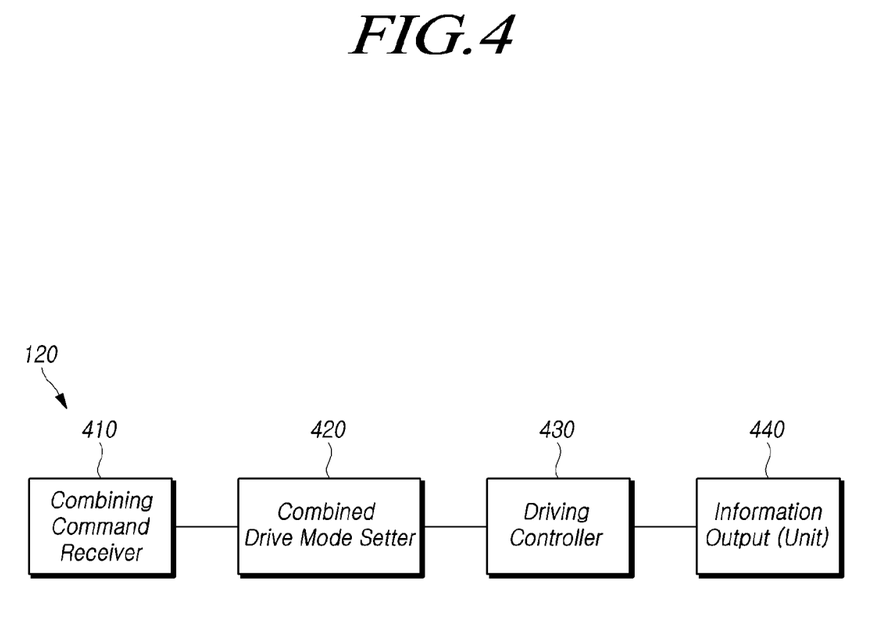
FIG. 4 is a diagram illustrating a configuration of a drive mode setting device according to an embodiment of the present disclosure.

FIG. 4 is a diagram illustrating a configuration of a drive mode setting device 120 according to an embodiment of the present disclosure.

Referring to FIG. 4, the drive mode setting device 120 according to an embodiment may include a combining command receiver 410, a combined drive mode setter 420, a driving controller 430, and an information output unit 440.

The combining command receiver 410 may receive a drive mode combining command input from the driver from the vehicle sensor 110.

Here, the combining command receiver 410 may receive a drive mode combining command further including a combining weight of each of the at least two drive modes.

The combined drive mode setter 420 may set the combined drive mode by combining at least two drive modes based on the received drive mode combining command.

Specifically, the combined drive mode setter 420 may extract two or more drive modes to be combined by the driver included in the drive mode combining command from among a plurality of pre-stored drive modes. In addition, the combined drive mode setter 420 may set the combined drive mode by combining the extracted two or more drive modes based on the combining weight included in the drive mode combining command.

The driving controller 430 may determine a steering assistance force value for a received steering input value based on the set combined drive mode, and generate and output a driving control signal corresponding to the steering assistance force value.

Here, the steering assistance force value may mean an assist torque amount or parameter required for the control operation to generate the steering assistance force by the driving unit 130, and the driving control signal may mean an electrical signal representing the steering assistance force value.

According to an example, a plurality of tuning maps respectively corresponding to a plurality of drive modes may be stored in advance in a storage unit provided in the vehicle. If a specific drive mode is selected, a steering assistance force value may be determined based on a tuning map of the selected drive mode.

The tuning map may refer to a look-up table in which a specific steering assistance force value for a specific steering input value is previously determined and organized using a specific design algorithm. That is, in each of the plurality of drive modes, since at least one of a plurality of parameter values including auxiliary torque, damping coefficient, inertia, and restoring force for driver torque may be set differently from each other, the characteristics of the steering assistance force obtained based on each set value may be different in each drive mode. Accordingly, for each drive mode, the steering assistance force value with respect to the steering input value of the driver may be stored as a tuning map.

Specifically, the driving controller 430 may extract a tuning map corresponding to each of the combined drive modes from a plurality of tuning maps corresponding to each of the plurality of drive modes, and may acquire each of the steering assistance force values using each of the extracted tuning maps, and may determine the final steering assistance force value by combining the acquired steering assistance force values.

Here, in the case that the drive mode combining command further includes a combining weight of each of the at least two drive modes, the driving controller 430 may reflect the combining weight to each of the acquired steering assistance force values, and may determine the final steering assistance force value by adding up the respective steering assistance force values to which the combining weight is reflected.

For example, in the case that a first drive mode and a second drive mode are selected and the combining weight of each of the first drive mode and the second drive mode is determined to be 9:1, the driving controller 430 adds up 0.9a obtained by multiplying the first steering assistance force value "a" by 0.9 in the first drive mode and 0.1b obtained by multiplying the second steering assistance force value "b" by 0.1 in the second drive mode to determine a final steering assistance force value "c" (=0.9a+0.1b).

The information output unit 440 may output information of the combined drive mode. The information output unit 440 may output a combined drive mode so as for the driver to recognize through visual, auditory, tactile, and the like.

In an embodiment, the information output unit 440 may be a display device, an audio device, a haptic device, or the like.

In an embodiment, the information output unit 440 may output a drive mode combining command input from the driver. For example, the information output unit 440 may output a drive mode combining command input by a driver through a drive mode combining switch.

Figure 5:
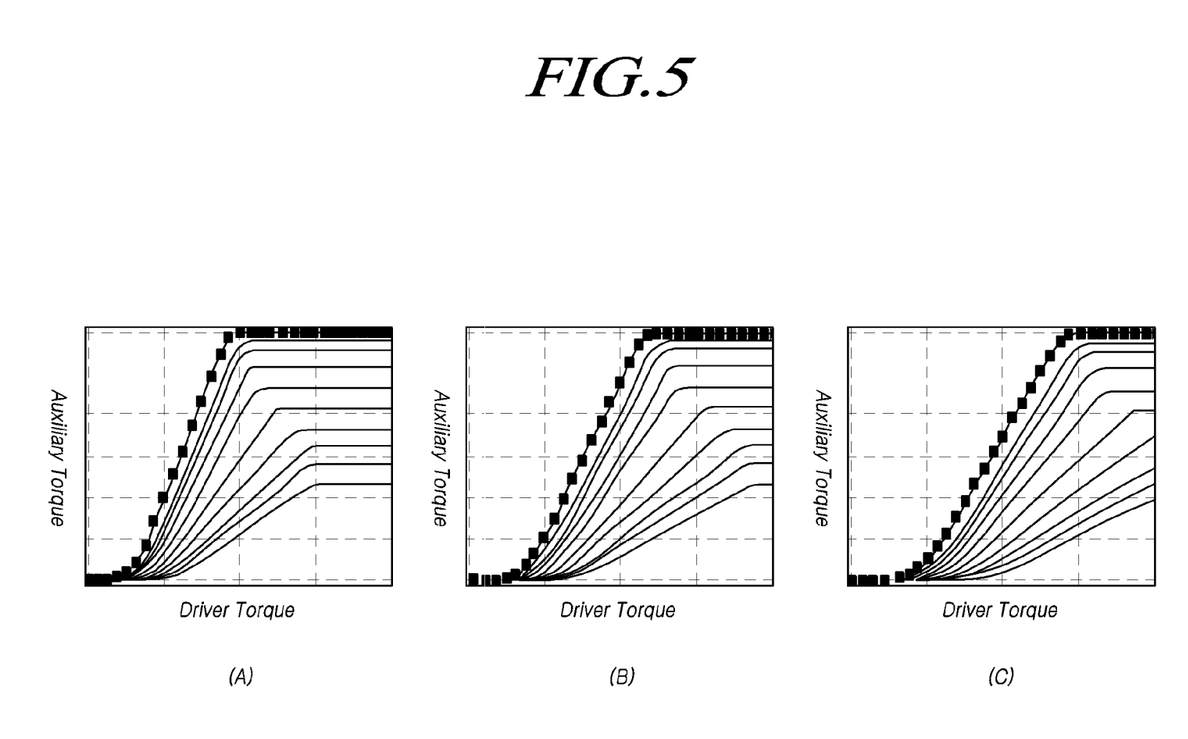
FIG. 5 is a diagram exemplarily illustrating a tuning map for a drive mode according to an embodiment of the present disclosure.

FIG. 5 is a diagram exemplarily illustrating a tuning map for a drive mode according to an embodiment of the present disclosure.

Referring to FIG. 5, (A) illustrates a first tuning map for the comfort mode, (B) illustrates a second tuning map for the normal mode, and (C) illustrates a third tuning map for the sport mode. As described above, in this tuning map, the steering assistance force value (auxiliary torque) according to the steering input value (driver torque by the driver) is predetermined.

Comparing the first tuning map and the second tuning map, the slope in the first tuning map is relatively larger than the slope in the second tuning map. In the comfort mode, since a large steering assistance force value is provided even with a small difference in steering input values, the driver can control the steering of the vehicle with little effort in the set comfort mode.

Comparing the second tuning map with the third tuning map, the slope in the third tuning map is relatively smaller than the slope in the second tuning map. This is to enable the driver to stably steer even at a high vehicle speed by providing a small steering assistance force value even with a large steering input value difference in the sport mode.

As such, the drive mode setting device 120 according to an embodiment of the present disclosure may combine at least two drive modes among a plurality of drive modes having different output performance of a steering assistance force value according to vehicle speed, so that it is possible to provide a drive mode that suits the driver's taste.

Figure 6:
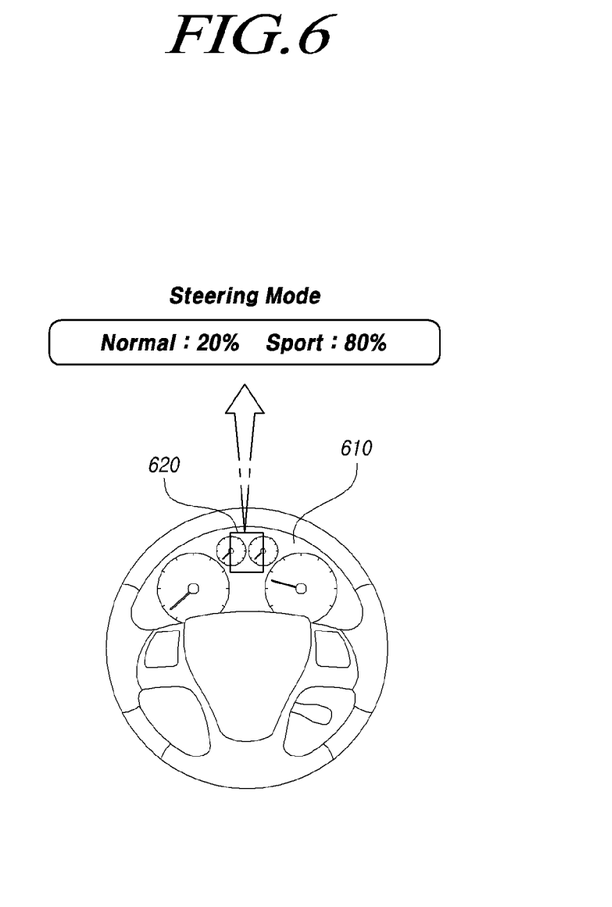
FIG. 6 illustrates an example of outputting information of a combined drive mode according to an embodiment of the present disclosure.

FIG. 6 illustrates an example of outputting information of a combined drive mode according to an embodiment of the present disclosure.

Referring to FIG. 6, a dashboard 610 of the vehicle is illustrated, and the dashboard 610 includes a display device 620 that outputs information of the combined drive mode in order for the driver to visually recognize the information. Accordingly, if the combined drive mode is set according to the drive mode combining command input from the driver, as shown in FIG. 6, the display 620 may output the drive mode and the combining weight that the driver intents to combine.

Figure 7:
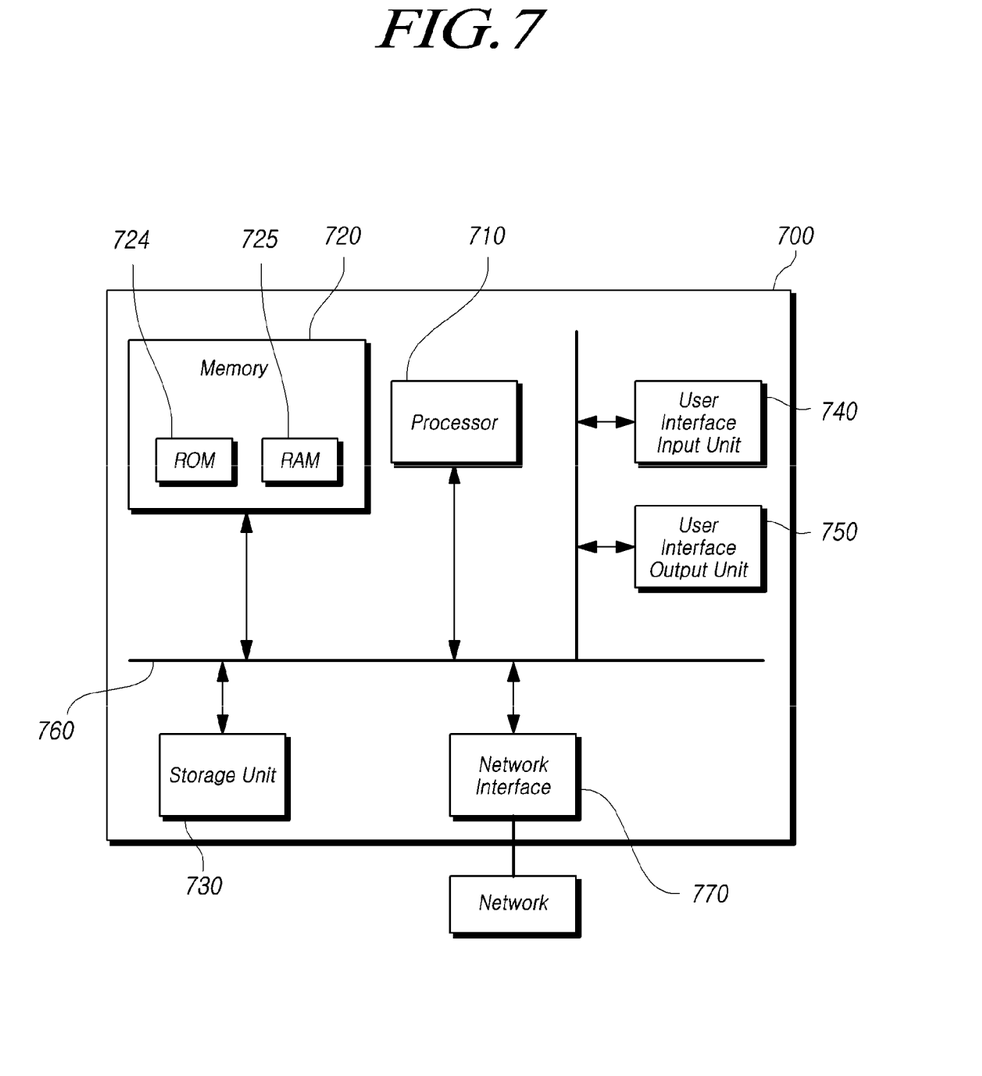
FIG. 7 is a diagram illustrating a configuration of a drive mode setting device according to another embodiment of the present disclosure.

FIG. 7 is a diagram illustrating a configuration of a drive mode setting device 120 according to another embodiment of the present disclosure.

The above-described embodiments of the present disclosure may be implemented in a computer system, for example, as a computer-readable recording medium. As shown in FIG. 7, the computer system 700 such as the drive mode setting device 120 may include at least one component of one or more processors 710, a memory 720, a storage unit 730, a user interface input unit 740, and a user interface output unit 750. In addition, these components may communicate with each other via the bus 760. In addition, computer system 700 may also include a network interface 770 for connecting to a network. The processor 710 may be a CPU or a semiconductor device capable of executing processing instructions stored in the memory 720 and/or the storage unit 730. The memory 720 and the storage unit 730 may include various types of volatile/nonvolatile storage media. For example, the memory may include ROM 724 and RAM 725.

Hereinafter, it will be described a drive mode setting method capable of performing all functions of the present disclosure.

Figure 8:
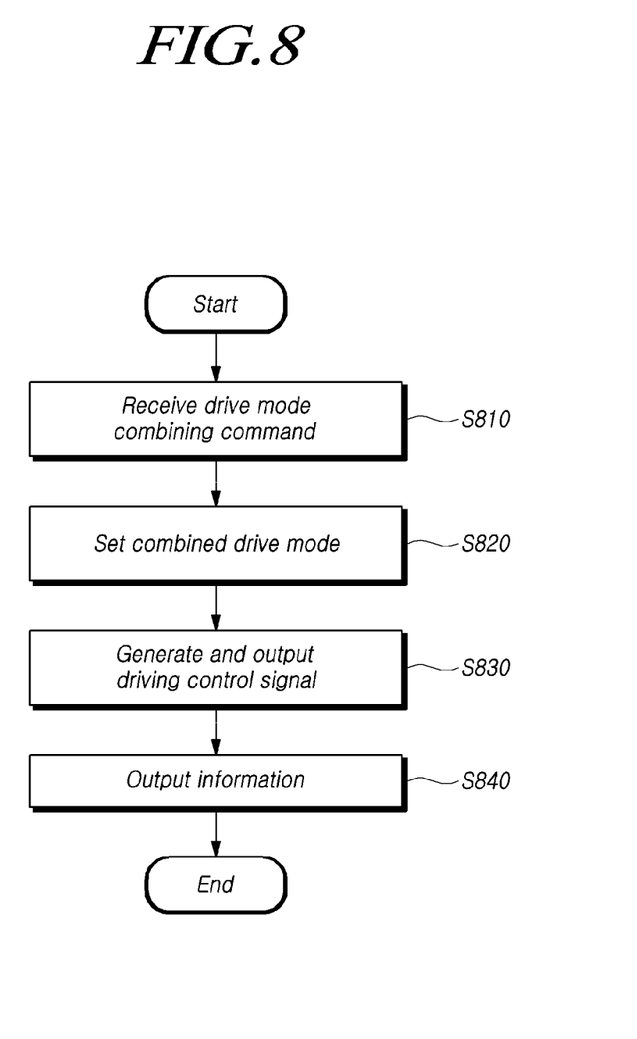
FIG. 8 is a flowchart of a drive mode setting method according to an embodiment of the present disclosure.

FIG. 8 is a flowchart of a drive mode setting method according to an embodiment of the present disclosure.

Referring to FIG. 8, the drive mode setting method may include receiving a drive mode combining command for instructing combining of at least two drive modes from among a plurality of pre-stored drive modes (S810), setting a combined drive mode by combining the at least two drive modes based on the drive mode combining command (S820), and determining a steering assistance force value with respect to a steering input value of a driver based on the combined drive mode, and generating and outputting a driving control signal corresponding to the steering assistance force value (S830).

The step S810 of receiving the drive mode combining command may include receiving the drive mode combining command further including a combining weight of each of the at least two drive modes.

In this case, the step S820 of setting the combined drive mode may include combining the at least two drive modes based on the combining weight.

Here, the step S830 of generating and outputting the driving control signal may include extracting a tuning map corresponding to each of the at least two drive modes combined in the combined drive mode from a plurality of tuning maps pre-stored corresponding to each of the plurality of drive modes, acquiring each of the steering assistance force values by using each of the extracted tuning maps, and determining a final steering assistance force value by combining the steering assistance force values respective acquired.

Here, in the case that the drive mode combining command further includes a combining weight of each of the at least two drive modes, the step S830 of generating and outputting the driving control signal may include determining the final steering assistance force value by reflecting the combining weights to the respective acquired steering assistance force values and by summing the respective steering assistance force values to which the combining weight is reflected.

Here, the drive mode setting method may further include outputting information on at least one of the drive mode combining command or the combined drive mode (S840).

Here, the step S840 of outputting information may be implemented as at least one of audio device, a display device, and a haptic device.

The device and method according to an embodiment of the present disclosure may be implemented in the form of program instructions that can be executed through various computer means and recorded in a computer-readable medium. The computer-readable medium may include program instructions, data files, data structures, and the like, alone or in combination.

The hardware device described above may be configured to operate as one or more software modules to perform the operations of the present disclosure, and vice versa.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A drive mode setting device comprising: at least one processor and a memory, wherein the memory is configured to store non-transitory instructions, and the at least one processor is configured to:
   receive a drive mode combining command for instructing combining of at least three drive modes from among a plurality of pre-stored drive modes, wherein the at least three drive modes include a first drive mode, a second drive mode, and a third drive mode, and the drive mode combining command includes a first combining weight for the first drive mode, a second combining weight for the second drive mode, and a third combining weight for the third drive mode, which are selected by a driver;
   set a combined drive mode by combining the first drive mode, the second drive mode, and the third drive mode based on the first combining weight, the second combining weight, and the third combining weight in the drive mode combining command;
   determine a final steering assistance force value for the combined drive mode based on the first combining weight, the second combining weight, and the third combining weight, and a first steering assistance force value determined based on the first drive mode, a second steering assistance force value determined based on the second drive mode, and a third steering assistance force value determined based on the third drive mode, and generate and output a driving control signal corresponding to the final steering assistance force value;
   control a host vehicle based on the driving control signal according to the combined drive mode; and
   output information on the combined drive mode.

2. The drive mode setting device of claim 1, wherein the at least one processor is further configured to,
   extract a tuning map corresponding to each of the first and second drive modes combined in the combined drive mode from a plurality of tuning maps corresponding to each of the plurality of drive modes, and
   acquire each of the first and second steering assistance force values for the steering input value of the driver by using each of the extracted tuning maps.

3. The drive mode setting device of claim 2, wherein
   the drive mode combining command further includes a combining weight ratio of the first and second drive modes, and
   the at least one processor is configured to determine the final steering assistance force value for generating the driving control signal based on the combining weight ratio.

4. The drive mode setting device of claim 1, further comprising a drive mode combining switch including at least one of a tuning member or a touch recognition device, wherein
the drive mode combining switch is configured to generate the drive mode combining command, and
the at least three drive modes are selected based on a tuning position indicated by the tuning member or a touch recognition position recognized through the touch recognition device.

5. The drive mode setting device of claim 4, wherein
the drive mode combining command further includes a combining weight ratio of the first and second drive modes, and
the combining weight ratio is determined based on the tuning position indicated by the tuning member or the touch recognition position recognized through the touch recognition device.

6. The drive mode setting device of claim 1, wherein, in the plurality of pre-stored drive modes, at least one of a plurality of parameter values including auxiliary torque for driver torque, damping coefficient, inertia, and restoring force is set differently.

7. The drive mode setting device of claim 1, wherein the at least one processor is further configured to output the information on the drive mode combining command.

8. The drive mode setting device of claim 1, wherein the at least one processor is configured to output the information through at least one of an audio device, a display device, or a haptic device.

9. The drive mode setting device of claim 1, wherein
the at least one processor is configured to determine the final steering assistance force value by adding ( ) a first value obtained by multiplying the first steering assistance force value in the first drive mode by the first combining weight, (ii) a second value obtained by multiplying the second steering assistance force value in the second drive mode by the second combining weight, and (iii) a third value obtained by multiplying the third steering assistance force value in the third drive mode by the third combining weight.

10. A drive mode setting method comprising:
receiving a drive mode combining command for instructing combining of at least three drive modes from among a plurality of pre-stored drive modes, wherein the at least three drive modes include a first drive mode, a second drive mode, and a third drive mode, and the drive mode combining command includes a first combining weight for the first drive mode, a second combining weight for the second drive mode, and a third combining weight for the third drive mode, which are selected by a driver;
setting a combined drive mode by combining the first drive mode, the second drive mode, and the third drive mode based on the first combining weight, the second combining weight, and the third combining weight in the drive mode combining command;
determining a final steering assistance force value for the combined drive mode based on the first combining weight, the second combining weight, and the third combining weight, and a first steering assistance force value determined based on the first drive mode, a second steering assistance force value determined based on the second drive mode, and a third steering assistance force value determined based on the third drive mode, and generating and outputting a driving control signal corresponding to the final steering assistance force value;
controlling a host vehicle based on the driving control signal according to the combined drive mode; and
outputting information on the combined drive mode.

11. The drive mode setting method of claim 10, wherein the generating and outputting of the driving control signal comprises,
extracting a tuning map corresponding to each of the first and second drive modes combined in the combined drive mode from a plurality of tuning maps corresponding to each of the plurality of drive modes, and
acquiring each of the first and second steering assistance force values for the steering input value of the driver by using each of the extracted tuning maps.

12. The drive mode setting method of claim 11, wherein
the drive mode combining command further includes a combining weight ratio of the first and second drive modes, and
the final steering assistance force value for generating the driving control signal is determined based on the combining weight ratio.

13. The drive mode setting method of claim 10, wherein, in the plurality of pre-stored drive modes, at least one of a plurality of parameter values including auxiliary torque for driver torque, damping coefficient, inertia, and restoring force is set differently.

14. The drive mode setting method of claim 10, further comprising outputting information on the drive mode combining command.

15. The drive mode setting method of claim 10, wherein
the final steering assistance force value is determined by adding (i) a first value obtained by multiplying the first steering assistance force value in the first drive mode by the first combining weight, (ii) a second value obtained by multiplying the second steering assistance force value in the second drive mode by the second combining weight, and (iii) a third value obtained by multiplying the third steering assistance force value in the third drive mode by the third combining weight.

* * * * *